(12) United States Patent
Alessi et al.

(10) Patent No.: US 11,537,089 B2
(45) Date of Patent: *Dec. 27, 2022

(54) ULTRAVIOLET SENSOR FOR DETECTING INDOOR/OUTDOOR CONDITION

(71) Applicant: STMICROELECTRONICS S.R.L., Agrate Brianza (IT)

(72) Inventors: Enrico Rosario Alessi, Catania (IT); Giuseppe Spinella, Biancavilla (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 272 days.

This patent is subject to a terminal disclaimer.

(21) Appl. No.: 16/725,959

(22) Filed: Dec. 23, 2019

(65) Prior Publication Data
US 2020/0142362 A1 May 7, 2020

Related U.S. Application Data

(62) Division of application No. 14/749,414, filed on Jun. 24, 2015, now Pat. No. 10,545,463.

(51) Int. Cl.
 *G05B 13/02* (2006.01)
(52) U.S. Cl.
 CPC ................... *G05B 13/024* (2013.01)
(58) Field of Classification Search
 USPC .......................................................... 700/28
 See application file for complete search history.

(56) References Cited

U.S. PATENT DOCUMENTS

| | | | |
|---|---|---|---|
| 7,500,746 B1 * | 3/2009 | Howell | G02C 5/001 351/158 |
| 8,277,734 B2 * | 10/2012 | Koudymov | A23L 3/28 436/164 |
| 8,644,624 B2 | 2/2014 | Tao et al. | |
| 9,568,359 B2 | 2/2017 | Spinella et al. | |
| 2005/0151656 A1 | 7/2005 | Yuen | |

(Continued)

OTHER PUBLICATIONS

Klimov et al., "The atmosphere UV background phenomena measured by detector on-board "Tatiana" satellite," *Proceedings of the $30^{th}$ International Cosmic Ray Conference* 5(HE part 2):869-872, 2008.

(Continued)

*Primary Examiner* — Md Azad
(74) *Attorney, Agent, or Firm* — Seed Intellectual Property Law Group LLP

(57) ABSTRACT

A method includes sensing a level of ultraviolet radiation in an environment in which an electronic device is present, detecting an environmental condition of the electronic device based upon the sensed level of ultraviolet radiation, and controlling the operation of the electronic device based upon the detected environmental condition. The detected environmental condition may include an indoor condition, outdoor condition, near-window condition, near-door condition, and in-vehicle condition of the electronic device. Controlling the operation of the electronic device based upon the detected environmental condition may include selectively activating and deactivating components of the device based on the detected environmental condition to reduce power consumption of the device.

20 Claims, 3 Drawing Sheets

(56) References Cited

U.S. PATENT DOCUMENTS

| | | |
|---|---|---|
| 2006/0188389 A1 | 8/2006 | Levy |
| 2007/0108389 A1 | 5/2007 | Makela et al. |
| 2011/0191272 A1* | 8/2011 | McGuire .................. G06N 5/00 706/11 |
| 2014/0191873 A1 | 7/2014 | Kreiner et al. |
| 2015/0102208 A1 | 4/2015 | Appelboom et al. |
| 2015/0253462 A1 | 9/2015 | Chen et al. |
| 2015/0342005 A1 | 11/2015 | Akcasu et al. |
| 2015/0346024 A1 | 12/2015 | Hingorani et al. |
| 2016/0062326 A1 | 3/2016 | Bang et al. |
| 2016/0364131 A1 | 12/2016 | Dumont et al. |

OTHER PUBLICATIONS

Zhou et al., "IODetector: A Generic Service for Indoor Outdoor Detection," *SenSys '12*, Nov. 6-9, 2012, Toronto, ON, Canada, 14 pages.

* cited by examiner

ULTRAVIOLET SENSOR FOR DETECTING INDOOR/OUTDOOR CONDITION

BACKGROUND

Technical Field

The present application is directed generally to the sensing of ultraviolet radiation and, more specifically, to the sensing of ultraviolet radiation to detect an indoor or outdoor condition of an electronic device and the control of the electronic device based on the sensed indoor or outdoor condition.

Description of the Related Art

Controlling the operation of electronic devices, particularly portable electronic devices such as smartphones and tablet computers, could benefit from knowledge of the environment in which the electronic device is present. More specifically, sensing whether the electronic device is located in an indoor or outdoor environment could then be used to control the operation of the device in a different manner depending on the environment in which the device is located. For example, before turning on Global Positioning System (GPS) functionality of an electronic device a determination could be made as to whether the device is in an outdoor environment. Activation of GPS functionality only when the electronic device is in an outdoor environment would typically be desirable since such functionality is not typically needed when the device is in an indoor environment and may not function properly in an indoor environment.

Another example where control of an electronic device could benefit from knowledge of whether the device is in an indoor or outdoor environment is the Wi-Fi functionality of the device. Before activating Wi-Fi functionality of an electronic device to search for access points of Wi-Fi networks in the vicinity of the device, a determination could be made as to whether the device is in an indoor environment. Activation of Wi-Fi functionality only when the electronic device is in an indoor environment would be desirable since Wi-Fi networks are not typically present in outdoor environments. Thus, the activation of the Wi-Fi functionality in an outdoor environment only wastes battery power of the electronic device.

There is a need for improved techniques of determining whether an electronic device is present in an indoor or outdoor environment to enable control of the electronic device to be modified accordingly.

BRIEF SUMMARY

One embodiment of the present disclosure is a method that includes sensing a level of ultraviolet radiation in an environment in which an electronic device is present, detecting an environmental condition of the electronic device based upon the sensed level of ultraviolet radiation, and controlling the operation of the electronic device based upon the detected environmental condition. The detected environment condition may include an indoor condition, outdoor condition, near-window condition, near-door condition, and in-vehicle condition of the electronic device. Controlling the operation of the electronic device based upon the detected environmental condition may include selectively activating and deactivating components of the device based on the detected environmental condition to reduce power consumption of the device.

DETAILED DESCRIPTION

Figure 1:
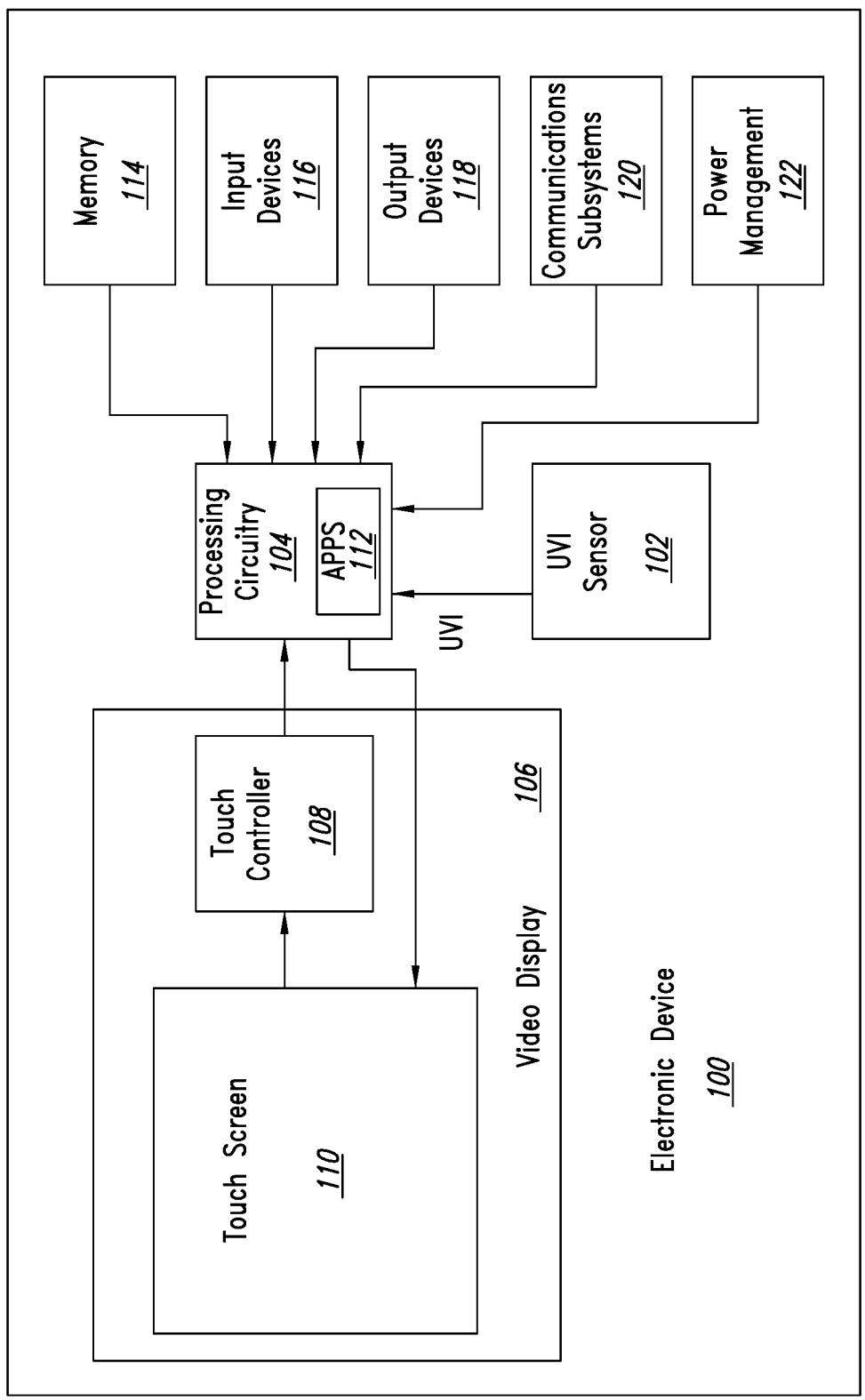
FIG. 1 is a functional block diagram of an electronic device including an ultraviolet index (UVI) sensor that is used for detecting indoor, outdoor and other related environmental conditions of the device according to one embodiment of the present disclosure.

FIG. 1 is a functional block diagram of an electronic device 100 including an ultraviolet (UV) sensor 102 for detecting indoor, outdoor and other related environmental conditions of the electronic device according to one embodiment of the present disclosure. In one embodiment, the UV sensor 102 senses UV radiation and determines an ultraviolet index (UVI) for the sensed UV radiation, and accordingly in FIG. 1 the sensor is indicated as a UVI sensor. In this embodiment, the UVI sensor 102 senses UV radiation of the environment in which the electronic device 100 is present and generates a corresponding UVI signal indicating the UVI in the environment and thereby an environmental condition of the device, with this environmental condition then being utilized in controlling the operation of the device, as will be explained in more detail below.

In the following description, certain details are set forth in conjunction with the described embodiments to provide a sufficient understanding of the present disclosure. One skilled in the art will appreciate, however, that the subject matter of the present disclosure may be practiced without these particular details. Furthermore, one skilled in the art will appreciate that the example embodiments described below do not limit the scope of the present disclosure to these described embodiments, and will also understand that various modifications and combinations of the disclosed embodiments and components of such embodiments are within the scope of the present disclosure. Embodiments including fewer than all the components of any of the respective described embodiments may also be within the scope of the present disclosure although not expressly described in detail below. The operation of well-known components and/or processes has not been shown or described in detail below to avoid unnecessarily obscuring the present disclosure.

The electronic device 100 in the example embodiment of FIG. 1 includes processing circuitry 104 that processes the UVI signal from the sensor 102 to determine an environmental condition of the device and thereafter controls the operation of the device based on the determined environmental condition, as will be described in more detail below. The electronic device 100 further includes a video display 106 having a touch controller 108 that controls a touch screen 110 to sense user touches. The touch screen 110 typically includes a touch display (not shown) such as a liquid crystal display (LCD) to which a touch panel (not shown) such as a capacitive touch panel is attached or formed as an integral part. In operation, the touch controller 108 controls the touch screen 110 to sense touches of a user of the electronic device 100 and provides sensed touch information to the processing circuitry 104 to thereby allow the user to interface with and control the operation of the electronic device. The processing circuitry 104 also controls the touch screen 110 to display desired visual content on the touch display portion of the touch screen and executes applications or "apps" 112 that provide specific functionality for a user of the device 100.

The electronic device 100 further includes data storage or memory 114 coupled to the processing circuitry 104 for storing and retrieving data including the apps 112 and other software executing on the processing circuitry and utilized by the electronic device 100 during operation. Examples of typical types of memory 114 include solid state memory such as DRAM, SRAM and FLASH, solid state drives (SSDs), and may include any other type of memory suited to the desired functionality of the electronic device 100 including digital video disks (DVDs), compact disk read-only (CD-ROMs), compact disk read-write (CD-RW) memories, magnetic tape, hard and floppy magnetic disks, tape cassettes, and so on.

Input devices 116 are coupled to the processing circuitry 104 and may include a keypad, whether implemented through the touch screen 110 or separately, a pressure sensor, accelerometer, microphone, keyboard, mouse, digital camera to capture still and video images, and other suitable input devices. Output devices 118 are coupled to the processing circuitry 104 and may include, for example, audio output devices such as a speaker, printer, vibration device, and so on. The input devices 116 and output devices 118 collectively may include other types of typical communications ports for the electronic device 100, such as USB ports, HDMI ports, and so on.

The electronic device 100 further includes communications subsystems 120 coupled to the processing circuitry 104 and which may include Wi-Fi, GPS, cellular and Bluetooth subsystems for providing the device with the corresponding functionality. A power management subsystem 122 is also coupled to the processing circuitry 104 and would typically include a battery for powering the electronic device 100 and also control circuitry for controlling power-related operating modes of the device such as charging of the battery, power-savings modes, and so on.

The specific type and number of input devices 116, output devices 118, communications subsystems 120, and even the specific functionality of the power management subsystem 122 will of course depend on the type of the electronic device 100, which may be any type of electronic device or system such as a smartphone, tablet computer, personal computer, laptop computer, portable music or video player, and so on. For the purposes of the present disclosure, the electronic device 100 is assumed to be a smartphone by way of example and in this case the processing circuitry 104 includes an application processor.

Figure 2:
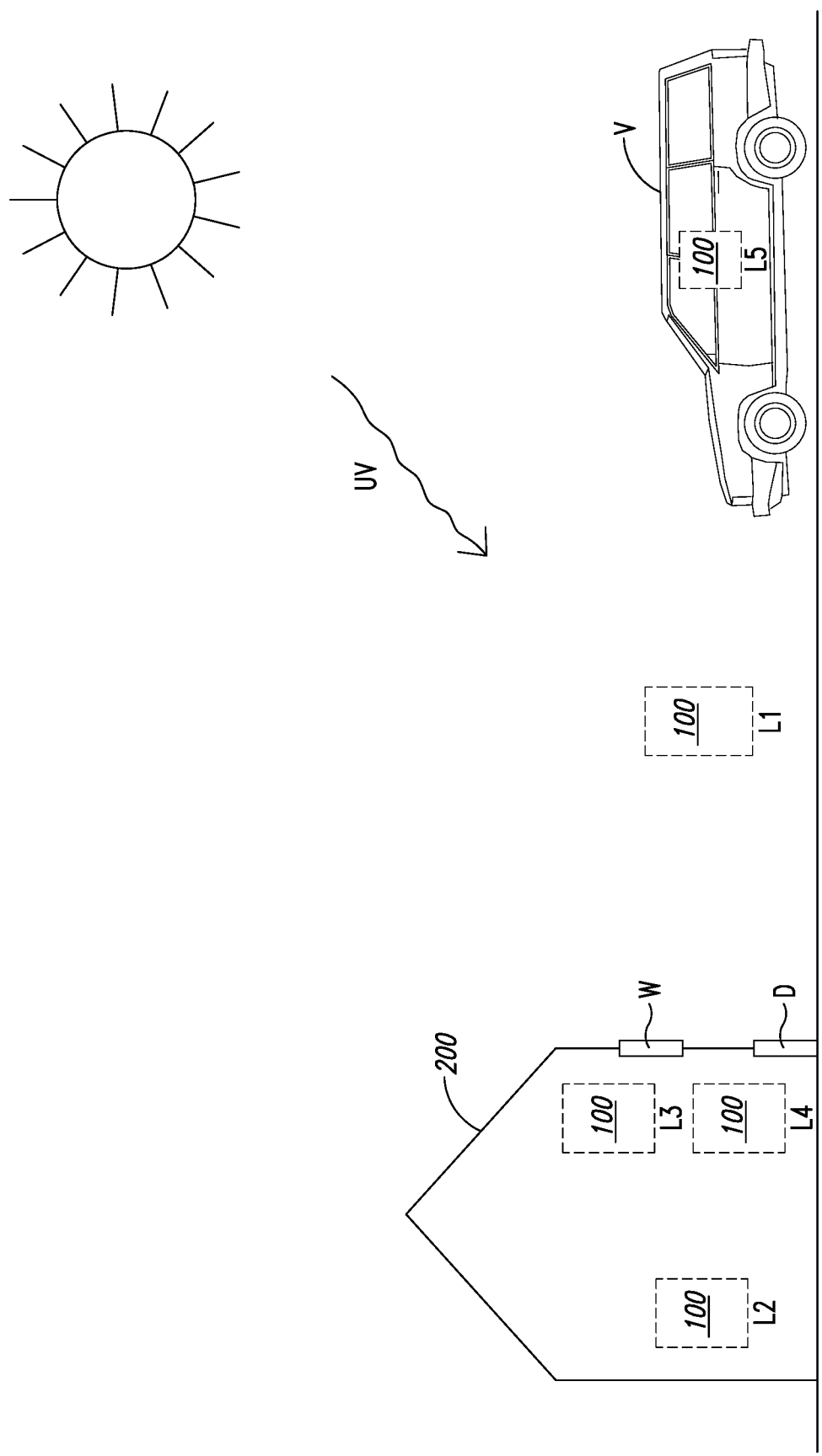
FIG. 2 is a diagram illustrating several different environmental conditions of the electronic device of FIG. 1 which are detected according to one embodiment of the present disclosure.

Referring now to FIGS. 1 and 2, the operation of the electronic device 100 in utilizing the UVI sensor 102 to detect an environmental condition of the electronic device and controlling the device based on the detected condition will now be described in more detail. FIG. 2 is a diagram illustrating several different environmental conditions of the electronic device 100 of FIG. 1 that are detected using the UVI sensor 102 according to one embodiment of the present disclosure. In the embodiment of FIG. 2, the detected environmental conditions are an outdoor condition, an indoor condition, a near-window condition, a near-door condition, and an in-vehicle condition, each of which will be described in more detail below.

Before describing each of these environmental conditions and the corresponding control of the electronic device 100 in more detail, the characteristics of the UVI signal will first be briefly described. As will be appreciated by those skilled in the art, UV radiation covers the portion of the electromagnetic spectrum with wavelengths $\lambda$ between 100 nm and 400 nm and is typically divided into three categories: 1) UVA radiation (in the 315-400 nm range); 2) UVB radiation (in the 280-315 nm range); and 3) UVC radiation (in the 100-280 nm range). In general, the degree of penetration of UV radiation into the human body and thus the danger for humans increases as the wavelength of the UV radiation decreases and, consequently, as the frequency increases. More details about the UVI, UV radiation generally, and one embodiment of the UVI sensor 102 are contained in U.S. patent application Ser. No. 14/669,593, which is incorporated by reference herein in its entirety.

The UVI signal provides an indication of the level of UV radiation coming from a source. Typically, the UVI refers to solar radiation that reaches the Earth's surface, but may likewise refer to other sources of UV radiation. In general, the higher the level of UV radiation the larger the value of the UVI and thus the larger the value of the UVI signal. The level of UV radiation incident upon the UVI sensor 102 and thus on the electronic device 100 will vary depending on the particular environment in which the device is present, which is referred to as an environmental condition of the device in the present description. Accordingly, the characteristics of the UVI signal from the UVI sensor 102 are utilized in defining the five environmental conditions in the embodiment illustrated in FIG. 2.

Referring again to FIGS. 1 and 2, the UVI sensor 102 senses the UV radiation incident upon the sensor and thus incident on the device 100 and generates the UVI signal for the sensed UV radiation. The UVI sensor 102 senses the UV radiation at suitable update intervals to update the value of the UVI signal accordingly. Where the UVI signal is a digital signal including a number of bits this digital signal is provided directly to the processing circuitry 104. If the UVI signal is an analog signal, the signal would be digitized and then supplied to the processing circuitry 104.

Upon receiving the UVI signal from the UVI sensor 102, the processing circuitry 104 processes the signal to determine an environmental condition of the electronic device 100. Referring to FIG. 2, assumed the electronic device 100 is initially outdoors in a location L1 as seen in the figure. In this situation, the UVI sensor 102 senses UV radiation from the sun, and other outdoor sources, and generates the UVI signal having a value indicating the UVI of this sensed radiation. Because the location L1 is outside and UV radiation from the sun and other sources is present outdoors the UVI signal will have a non-zero value in this situation. Accordingly, in one embodiment when the magnitude of the UVI signal is greater than a non-zero outdoor threshold OT, the processing circuitry 104 determines the environmental condition of the device is the outdoor condition, meaning the electronic device is located outside or outdoors.

Even during non-daylight hours, when the electronic device 100 is outdoors there is enough UV radiation present that the magnitude of the UVI signal will be substantially greater than for the indoor environmental condition, which will be described in more detail below. In this way, the magnitude of the UVI signal allows the UVI sensor 102 to function as an indoor/outdoor sensor for the electronic device 100. In one embodiment, the outdoor threshold OT could vary as a function of the time of day to thereby provide for more reliable detection of the outdoor versus indoor condition of the electronic device 100.

Once the processing circuitry 104 has determined that the environmental condition of the electronic device 100 is the outdoor condition, the processing circuitry may control the overall operation of the electronic device as well as the operation of certain components within the device in a manner suited to the outdoor condition. In this situation, when the electronic device 100 is outdoors some components may be turned on or activated since these components are typically needed or utilized when the electronic device is outdoors. Conversely, other components may be turned off or deactivated when the electronic device 100 is outdoors since these other components are typically not needed when the device is outdoors.

As previously mentioned, the electronic device 100 is assumed to be a smartphone by way of example in the present description. In this situation, when the processing circuitry 104 detects the outdoor condition for the electronic device 100 the processing circuitry may activate GPS components and deactivate Wi-Fi components contained in the communications subsystems 120 of the device. This is true because GPS functionality of the device 100 would be utilized when the device is outdoors and thus this functionality is activated. Conversely, the Wi-Fi functionality is deactivated so that the device does not waste power searching for access points of nearby Wi-Fi networks. When the electronic device 100 is outdoors such Wi-Fi networks are not typically available and thus operation of the Wi-Fi functionality will only waste power of the electronic device. Bluetooth functionality of the device 100 could also be deactivated when the device 100 has the outdoor condition.

In addition to controlling the GPS, Wi-Fi and Bluetooth functionality of the device 100 as just described, other functionality of the device may also be controlled based on the detected outdoor condition of the device. For example, the operation of the digital camera, which is considered one of the input devices 116 as mentioned above with reference to FIG. 1, could be adjusted based on the detected outdoor condition of electronic device 100 to improve the quality of images captured by the digital camera. Automatic white balance (AWB) and color balancing of images captured by the digital camera may be adjusted for operation of the digital camera outdoors to thereby improve the quality of the captured images. In addition to the above examples, the control and operation of other components of the device 100 may also be modified or adjusted based on the detected outdoor condition of the electronic device 100. For example, the brightness of the touch screen 110 could be increased.

Referring again to FIG. 2, now assume the electronic device 100 is located not outdoors at the location L1 but instead is present at a location L2 that is within a structure 200 such as a house, store, office building, factory, warehouse, or any other type of structure. In this situation the processing circuitry 104 once again processes the UVI signal to determine the environmental condition of the electronic device 100. When at the location L2, the electronic device 100 will not be exposed to the UV radiation that is present when the device is outdoors (i.e., has the outdoor condition). At the location L2 the electronic device 100 is assumed to be within the structure 200 and not near any door D or window W of the structure. In this situation, the UV radiation sensed by the UVI sensor 102 will be much lower than that sensed for the outdoor condition at the location L1. The sensed UV radiation would typically be negligible in this situation and thus the UVI signal will have a much smaller value (i.e., typically approximately zero) when the electronic device 100 has the indoor condition.

When the electronic device 100 is present at the location L2, the processing circuitry 104 determines the magnitude of the UVI signal is less than the outdoor threshold OT. Also, in this situation the magnitude of the UVI signal will remain relatively constant at this relatively small value. As a result, in this situation the processing circuitry 104 determines the environmental condition of the device is the indoor condition, meaning the electronic device is located indoors and not near a door D or window W of the structure 200. Once the processing circuitry 104 has determined that the environmental condition of the electronic device 100 is the indoor condition, the processing circuitry again controls the operation of the components of the electronic device in a manner suited to the indoor condition. Some components can be activated while others are deactivated just as before for the outdoor condition, except different components are activated and deactivated to modify operation for the indoor condition. For example, when the detected environmental condition of the electronic device 100 is the indoor condition the GPS functionality of the device may be deactivated while the Wi-Fi and Bluetooth functionality are activated. Moreover, the AWB and color balancing of images captured by the digital camera may be adjusted for operation of the digital camera indoors in an artificial light environment to thereby improve the quality of the captured images. In relation to the operation of the digital camera, the UVI sensor 102 may thus be viewed as functioning as a natural versus artificial light sensor to adjust the operation of the camera accordingly.

In another embodiment utilizing detection of the indoor condition, the input devices 116 (FIG. 1) of the electronic device 100 further includes a gas sensor that detects particles contained in the ambient air in which the electronic device is present. The processing circuitry 104 utilizes a signal from the gas sensor to sense the quality of the ambient air around the electronic device 100 and in this way implements an indoor air quality subsystem for the electronic device. Such an indoor air quality subsystem could perform various actions responsive to the signal from the gas sensor, such as displaying a notification on the video display 106 (FIG. 1) indicating the quality of the ambient air at the current indoor location of the electronic device 100.

Also, when the detected environmental condition of the electronic device 100 is the indoor condition, other functionality of the electronic device may be modified just as mentioned above for outdoor condition. For example, when indoors the GPS functionality is deactivated and instead of GPS functionality for navigation purposes, the electronic device 100 may be utilized as part of an indoor navigation system to allow a user of the device to navigate when indoors or when GPS functionality is otherwise unavailable. In such an indoor navigation system the electronic device 100 communicates with a suitable network, such as a Wi-Fi network, and may utilize sensors such as accelerometers, magnetometers, and gyroscopes to implement navigational techniques such as pedestrian dead reckoning (PDR) to estimate the location of the electronic device 100 and thus the location of the user. In such an indoor navigation system these sensors and navigational techniques function in combination with the network to provide navigational guidance to the user of the electronic device 100 and allow that user to navigate to a desired location. As will be appreciated by those skilled in the art, the accuracy of such indoor navigational systems is typically greater than that possible with GPS systems. Moreover, this greater accuracy is typically required to provide the user with meaningful guidance in settings such as a big city when the user is navigating among buildings and trying, for example, to find a particular restaurant or store within a building or on a block of buildings.

Other operational modes of the electronic device 100 utilizing the detected indoor and outdoor environmental conditions may also be implemented. For example, in many cities even though the electronic device 100 may be outdoors an adequate GPS signal may not be available, meaning that the GPS functionality of the device is not available. In such a situation, even if the UVI signal from the UVI sensor 102 indicates electronic device 100 has the outdoor condition, when GPS functionality is not available navigation utilizing PDR or another suitable navigational guidance technique may be utilized to provide the user of the device with a functional navigational system even in the absence of GPS functionality.

Referring back to FIG. 2, the next environmental condition detected by the UVI sensor 102 and processing circuitry 104 is a near-window condition corresponding to the situation when electronic device 100 is positioned at a location L3 in the figure. At the location L3 the electronic device 100 is still indoors (i.e., within the structure 200 in the example of FIG. 2) but is proximate a window W of the structure. In this situation, enough UV radiation may propagate through the window W so that the UVI sensor 102 senses this radiation and generates the UVI signal having a non-zero value. The magnitude of the UVI signal is not as large as when the electronic device 100 is positioned at the location L1 and has the outdoor condition, and is not as small as the value of the UVI signal when the electronic device is positioned at the location L2 and has the indoor condition. The processing circuitry 104 may in this situation identify the near-window condition of the electronic device 100 through this intermediate magnitude for the UVI signal in combination with other characteristics of the generated UVI signal, as will now be explained more detail.

To detect the near-window condition, the UVI signal is continuously monitored to provide up to date essentially real time values for the UVI signal. Continuously monitored in this context means the value of the UVI sensor 102 senses UV radiation in the environment and updates the value of the UVI signal at a suitable rate. This update rate must be fast enough to quickly detect events that result in changes to the value of the UVI signal, such as the user moving the electronic device 100 from one location to another or moving the device proximate a window W or door D, as will be appreciated by those skilled in the art. By doing so, the near-window condition may be detected as follows. Assume the electronic device 100 is initially at the location L1 and thus has the outdoor condition. The processing circuitry 104 monitors the UVI signal as previously described and stores the most recent value for the UVI signal. Now assume a user of the electronic device 100 enters through the door D of the structure 200 into the structure. In this situation, the value of the UVI signal generated by the sensor 102 will drop from the relatively large value for when the electronic device 100 has the outdoor condition to a relatively small value now that electronic device is inside the structure 200. If the UVI value detected by the UVI sensor 102 remains at this relatively small value, then the indoor condition for the electronic device 100 will be detected, as described above.

If the user of the electronic device 100, after entering the structure 200 through the door D, then goes near a window W of the structure, the magnitude of the UVI signal detected by the UVI sensor 102 will increase due to UV radiation propagating through the window W. The resulting increased magnitude of the UVI signal will not be as large as for the outdoor condition, but will be significantly greater than the approximately zero value when the electronic device 100 has the indoor condition at location L2. As a result, the processing circuitry 104 may utilize the series of transitions of the UVI signal to detect the near-window condition of the electronic device 100 at the location L3. More specifically, the processing circuitry 140 monitors the UVI signal for the following pattern: 1) a transition of the UVI signal from a relatively large value to a relatively small value (this indicates the electronic device 100 goes from the outdoor condition to the indoor condition); and 2) a transition of the UVI signal from the relatively small value to an intermediate value that is less than the relatively large value. Upon detecting the near-window condition for the electronic device 100, the processing circuitry 104 controls the device accordingly. For example, the device 100 may be controlled in the same way as for the indoor condition. A particular situation where the detection of the near-window condition may be desirable in when the device 100 is utilizing indoor navigation in an environment where the user may be moving from one building to another, such as when touring a museum or walking around a mall. In such a situation, detection of the near-window condition of the electronic device 100 would help the navigation system in identifying the specific location of the device as the user walks from one building to another.

The near-window and near-door conditions can be detected only by monitoring UV changes (i.e., monitoring changes in the value of the UVI signal) while a user of the electronic device 100 is walking. For example, a low-high-high sequence of the UVI signal indicates the device 100 was in the indoor condition and has been taken outdoors. The sequence low-medium-low indicates the near and open window or open door conditions. The sequence high-high-high indicates the device 100 is outdoors (i.e., has the outdoor condition) and the sequence zero—zero-zero indicates the device is indoors or has the indoor condition. Other conditions of the electronic device 100 may also be detected through detection of sequences of values for the UVI signal (i.e., detecting how the value of the UVI signal changes over time).

Figure 3:
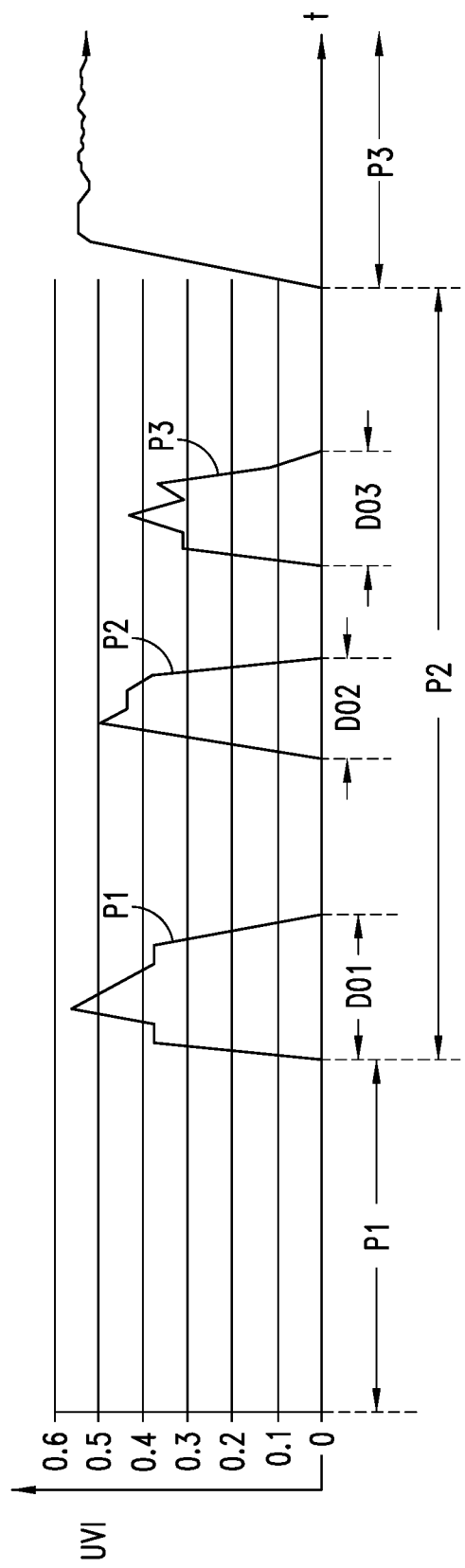
FIG. 3 is a signal timing diagram illustrating a signal from the UV sensor of FIG. 1 when the electronic device is in a near door condition as illustrated in FIG. 2.

The near-door condition of the electronic device 100 will now be described in more detail with reference to FIGS. 2 and 3. FIG. 3 is a signal timing diagram illustrating the UVI signal from the UV sensor 102 of FIG. 1 when the electronic device 100 is in a near-door condition, which is shown in FIG. 2 when the device is in the structure 200 at the location L4. Being near a door D that is relatively frequently opened and closed, such as the door of a commercial establishment like a coffee shop or store, will result in the UVI signal having a series of pulses as a function of time, each pulse corresponding to a time when the door D is open.

FIG. 3 illustrates the UVI signal as a function of time when the electronic device 100 is positioned in the near-door condition near the door D of the structure 200. An initial time period P1 corresponds to the time when the user has initially brought electronic device 100 through the door D and into the structure 200, and the door has then been closed. As a result of the closed door D, during the period P1 the UVI signal has a small magnitude that is near zero as it would be for the indoor condition of the electronic device 100. The processing circuitry 104 distinguishes between the indoor condition and the near-door condition of the electronic device 100 by subsequent pulses of the UVI signal that result from the door D opening and closing. When the electronic device 100 is near the door D, the UVI sensor 102 will sense the change in UV radiation that results each time the door opens and closes.

During a time period P2 shown in FIG. 3 the door D opens and closes three times, resulting in respective pulses in the UVI signal during this time period. A first pulse P1 has a duration DO1 during the time period P2 and indicates the first time the door D has been opened after the user brought electronic device 100 into the structure 200 and positioned it near the door. Similarly, a second pulse P2 has a duration DO2 indicating the second time the door D has been opened and the third pulse P3 has a duration DO3 indicating the third time the door D has been opened. By detecting pulses P in the UVI signal, the processing circuitry 104 detects the near-door condition of the electronic device 100. In the embodiment of FIG. 3, upon detecting three pulses P1-P3 within a specified maximum time period P2, the processing circuitry 104 determines the near-door condition for the electronic device 100 and controls the device accordingly. The maximum time period P2 allows the processing circuitry 104 to distinguish between the near-door condition and a user simply taking the electronic device 100 from the indoor condition to the outdoor condition.

Once again, as for the near-window condition the detection of the near-door condition could also be utilized in an indoor navigation system in an environment where the user is moving from one building to another. In such a situation, detection of the near-door condition of the electronic device 100 may, for example, help the navigation system in identify the specific location of the device. For example, such a condition could indicate that the user did indeed walk into a building proximate the current position of the user as estimated by the navigation system.

Referring back to FIG. 2, a final environmental condition of the electronic device 100 that is detected in the embodiment of FIG. 2 is an in-vehicle condition which is shown on the right side of the figure. The electronic device 100 has the in-vehicle environmental condition when at location L5 inside a vehicle V. In this situation, the UVI sensor 102 and electronic device 100 may be utilized as part of a smart backup for a GPS navigational system of the vehicle V. Vehicle navigational systems typically utilize GPS navigation. When such GPS navigation is not available, and when higher precision is required than GPS navigation can provide, supplemental or backup navigational systems typically function as backup navigational systems for the vehicle. Such backup systems are typically referred to as inertial systems and typically include accelerometers, magnetometers, gyroscopes, barometric pressure sensors, and so on to sense position of the vehicle V and provide guidance to a driver (not shown).

When the device 100 is positioned at location L5 in the vehicle V, the value of the UVI signal generated by UVI sensor 102 is very small due to the glass windows of the vehicle filtering almost all UV radiation. In this situation the electronic device 100 would detect the UVI signal having a very small value similar to the indoor condition when the device was located at the position L2. When the electronic device 100 is at location L5 in the vehicle V, the UVI signal would typically have a value similar to that for the indoor or near-window condition, but the electronic device 100 will also be receiving a GPS signal in this situation. As a result, the processing circuitry 104 may then utilize this GPS information in combination the detected the UVI signal to identify the in-vehicle condition for the electronic device 100 and control the device accordingly. For example, when the electronic device 100 detects the in-vehicle condition of the electronic device 100 and GPS functionality is not operable (i.e., an adequate GPS signal is not being received), then processing circuitry 104 may control an inertial navigational system and provide through the electronic device visual and audio navigational feedback to the driver of the vehicle V.

In another embodiment involving the vehicle V, the UVI signal can be monitored and utilized by the processing circuitry 104 to detect the transition of the vehicle V from an out-of-tunnel condition to an in-tunnel condition, and, conversely, to detect the transition of the in-tunnel condition to the out-of-tunnel condition. Detection of the transition from the out-of-tunnel condition to the in-tunnel condition could be utilized by the processing circuitry 104 in a type of back-up "PDR-like" navigation system for the vehicle V. The detection of this transition could also be utilized to turn on the lights of the vehicle V. In vehicles this automatic light activation feature is currently based on ambient light sensors (ALS) in the vehicle and as a result the detection is delayed until the vehicle travels far enough into the tunnel for the ambient light to drop below a threshold level. In contrast, the level of the signal generated by the UV sensor 102 would much more quickly change values to enable the out-of-tunnel to in-tunnel condition transition to be detected.

The processing circuitry 104 or another component in the electronic device 100 would typically include real-time clock circuitry to enable time-related functions of the device to operate properly. In some embodiments, the processing circuitry 104 could utilize time-of-day information provided by such real-time clock circuitry to further modify operation of the electronic device 100. The processing circuitry 104 could also utilize such time-of-day information in processing the UVI signal and determining an environmental condition of the electronic device 100.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
sensing ultraviolet radiation over time with an ultraviolet sensor, the ultraviolet radiation being in an environment in which an electronic device is present;
generating an ultraviolet index signal having ultraviolet index values for the sensed ultraviolet radiation, each of the ultraviolet index values being based on the sensed ultraviolet radiation at a different time of day;
detecting an environmental condition of the electronic device based upon the ultraviolet index values and at least one threshold, a value of the at least one threshold being a function of a time of day, wherein an ultraviolet index value of the ultraviolet index values is compared with a value of the at least one threshold that corresponds to the ultraviolet index value based on a time of day of the ultraviolet index value and a time of day of the value of the at least one threshold; and controlling operation of the electronic device based upon the detected environmental condition to control an activation and deactivation of components in the electronic device.

2. The method of claim 1, wherein detecting the environmental condition of the electronic device further comprises detecting an indoor condition and an outdoor condition, and controlling the activation and deactivation of components in the electronic device comprises:

deactivating a global positioning system (GPS) functionality and Bluetooth functionality of the electronic device when the electronic device has the indoor condition;

activating GPS functionality and Bluetooth functionality of the electronic device when the electronic device has the outdoor condition;

activating Wi-Fi functionality of the electronic device when the electronic device has the indoor condition; and deactivating Wi-Fi functionality of the electronic device when the electronic device has the outdoor condition.

3. The method of claim 1, wherein detecting the environmental condition of the electronic device further comprises detecting an indoor condition and an outdoor condition, and controlling the operation of the electronic device based upon the detected environmental condition comprises adjusting the operation of an image capture device contained in the electronic device based upon whether the electronic device is detected as having the indoor condition or the outdoor condition.

4. The method of claim 3, wherein adjusting the operation of the image capture device comprises:

automatically adjusting a white balance of the image capture device based upon whether the electronic device has the indoor or outdoor condition; and adjusting a color balance of the image capture device based upon whether the electronic device has the indoor or outdoor condition.

5. The method of claim 1, wherein controlling the operation of the electronic device based upon the detected environmental condition controls the activation and deactivation of components in the electronic device to reduce power consumption of the electronic device.

6. The method of claim 1, wherein a threshold of the at least one threshold is an outdoor threshold and detecting the environmental condition of the electronic device further comprises detecting either an indoor condition or an outdoor condition of the electronic device.

7. A device, comprising:

an ultraviolet light sensor; and processing circuitry electronically coupled to the ultraviolet light sensor, the processing circuitry configured to:

receive signals indicating ultraviolet light levels detected by the ultraviolet light sensor;

operate the device in a first operating mode in response to detection of a first defined sequence in the signals over a time of day;

operate the device in a second operating mode in response to detection of a second defined sequence in the signals over the time of day; and operate the device in a third operating mode in response to detection of a third defined sequence in the signals over the time of day, wherein each of the first defined sequence in the signals, the second defined sequence in the signals, or the third defined sequence in the signals is determined by comparing each ultraviolet light level of the ultraviolet light levels with a threshold value that corresponds to the ultraviolet light level based on a time point of day at which the ultraviolet light level is detected by the ultraviolet light sensor, the threshold value varying with the time of day.

8. The device of claim 7, further comprising:

one or more communication subsystems, the processing circuitry electronically coupled to the one or more communication subsystems and configured to:

process information received from a communication subsystem of the one or more communication subsystems; and operate the device in a fourth operating mode based on content of the information and based on the signals having a value below a first threshold.

9. The device of claim 8, wherein the communication subsystem is a global positioning system (GPS) and the content of the information is GPS information received over time indicating a changing position of the device.

10. The device of claim 8, wherein the one or more communication subsystems include a wireless communication subsystem for communicating over a local network, and the wireless communication subsystem is deactivated in the third operating mode.

11. The device of claim 7, wherein the third defined sequence includes at least two distinct signal levels.

12. The device of claim 11, the processing circuitry further configured to:

operate the device in a fourth operating mode in response to detection of a fourth defined sequence in the signals, the fourth defined sequence different from the third defined sequence and including at least two distinct signal levels.

13. The device of claim 7, further comprising:

one or more inertial sensors electronically coupled to the processing circuitry, wherein the processing circuitry is configured to, during operation of the device in the first operating mode, generate navigation information based on measurement signals received from the one or more inertial sensors.

14. The device of claim 7, wherein the processing circuitry is configured to adjust a threshold value for the signals based on the time of day.

15. An electronic device, comprising:

an ultraviolet sensor configured to sense ultraviolet radiation in an environment in which the electronic device is present and to generate an ultraviolet index signal indicating the ultraviolet index of the sensed ultraviolet radiation;

a component; and processing circuitry coupled to the ultraviolet sensor and the component, the processing circuitry configured to:

detect an environmental condition of the electronic device based on values of the ultraviolet index signal over time of day relative to a first threshold that varies over the time of day, wherein a value of the ultraviolet index signal is compared with a value of the first threshold that corresponds to the value of the ultraviolet index signal based on a time of day of the value of the ultraviolet index signal and a time of day of the value of the first threshold; and control an operating mode of the component based on the environmental condition detected.

16. The electronic device of claim 15, further comprising:
real-time clock circuitry, wherein the first threshold is a time-varying threshold determined based on time-of-day information provided by the real-time clock circuitry.

17. The electronic device of claim 15, wherein the processing circuitry is configured to detect a first environmental condition based on a sequence of three or more values of the ultraviolet index signal obtained over a defined time period.

18. The electronic device of claim 17, wherein the processing circuitry is configured to detect the first environmental condition as a result of a match between the sequence of three or more values and a defined pattern that includes at least two distinct levels.

19. The electronic device of claim 17, wherein the processing circuitry is configured to detect an outdoor environmental condition and an indoor environmental condition based on values of the ultraviolet index signal relative to the first threshold.

20. The electronic device of claim 15, wherein the processing circuitry is configured to detect the environmental condition of the electronic device based on values of the ultraviolet index signal relative to the first threshold and relative to a second threshold lower than the first threshold.

* * * * *